Jan. 12, 1971  G. M. WILMSEN  3,553,768
CASING SIZER
Filed Jan. 2, 1968  4 Sheets-Sheet 1
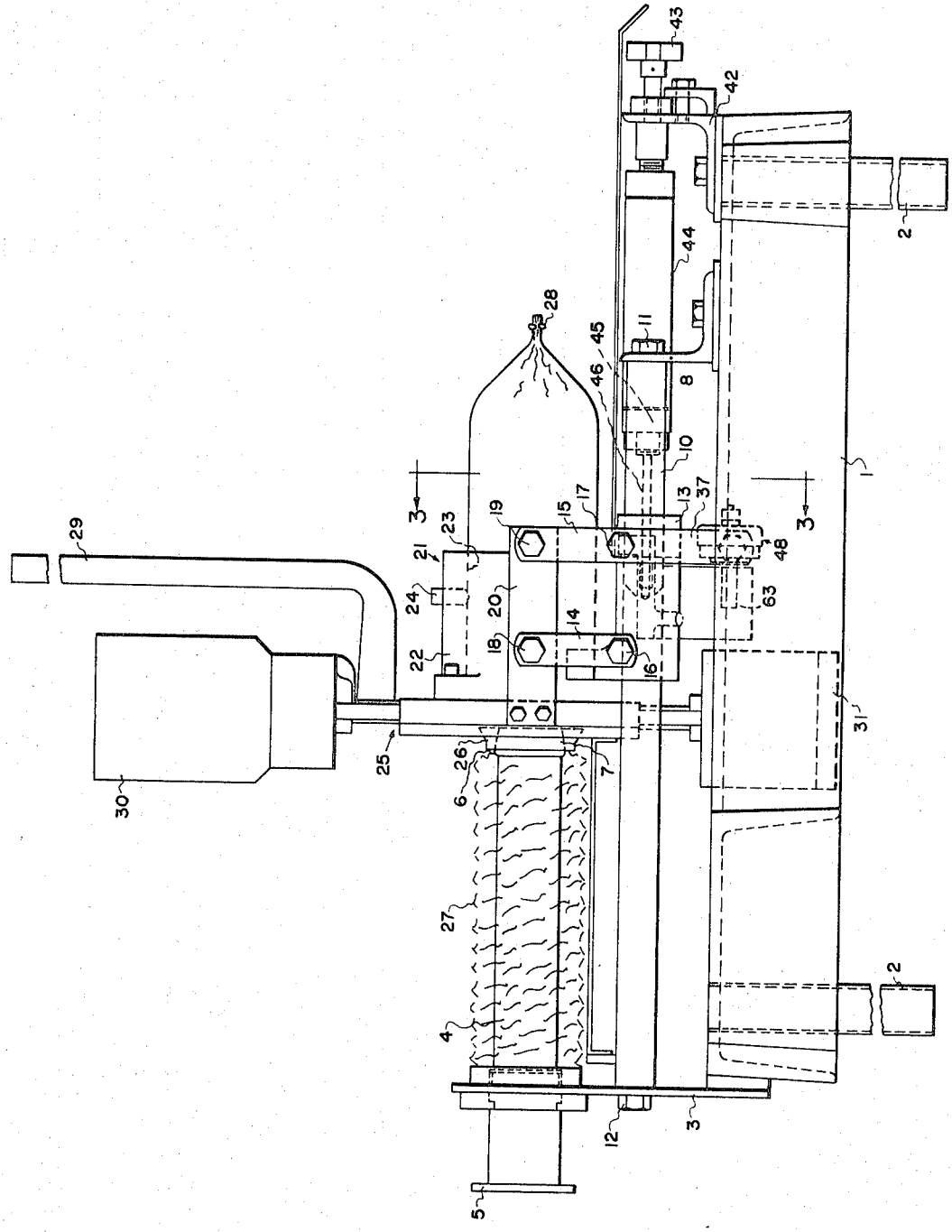
FIG. I
GEORGE M WILMSEN
INVENTOR.
his attorney Jan. 12, 1971   G. M. WILMSEN   3,553,768
CASING SIZER
Filed Jan. 2, 1968   4 Sheets-Sheet 3
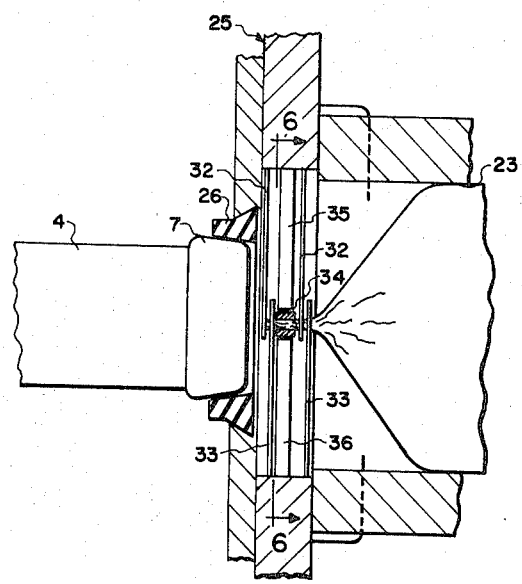
FIG. 5
FIG. 6
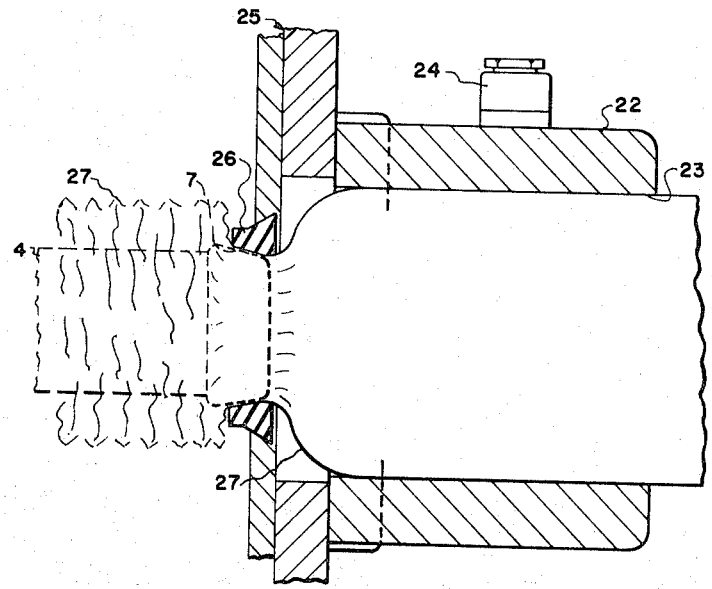
FIG. 4
GEORGE M WILMSEN
INVENTOR.
his attorney United States Patent Office 3,553,768
Patented Jan. 12, 1971

3,553,768
CASING SIZER
George M. Wilmsen, Danville, Ill., assignor to
Tee-Pak, Inc.
Filed Jan. 2, 1968, Ser. No. 695,248
Int. Cl. A22c 11/02
U.S. Cl. 17—35                                         8 Claims

ABSTRACT OF THE DISCLOSURE

A stuffing and sizing apparatus for the production of stuffed sausage products includes a stuffing horn on which a sausage casing is placed (preferably in a shirred condition) for filling with sausage emulsion. A friction device is engageable with the casing to press it against the end of the stuffing horn while the casing is being fed from the horn and stuffed. An air motor applies a controllable force to the friction device to move it laterally and thereby control the amount of friction force applied to the casing. The air motor is operated and controlled by air pressure sensitive means responsive to the diameter of the stuffed casing product and is operable when the casing over-expands to cause the air motor to permit the friction device to move away from the stuffing horn and allow the casing to flow off the horn more freely.

CROSS REFERENCE TO RELATED APPLICATIONS

This application discloses in part subject matter disclosed in the co-pending application of H. G. Washburn Ser. No. 584,732 filed Oct. 6, 1966, now Pat. No. 3,454,-980, issued July 15, 1969, both applications being owned by a common assignee.

BACKGROUND OF THE INVENTION

Field of the invention

This invention relates to new and useful improvements in apparatus for stuffing sausage meat into sausage casings and more particularly to an improved apparatus for controlling the size of stuffed sausages by controlling the rate of flow of sausage casing off the stuffing horn.

In the preparation of sausages, a sausage paste or emulsion is formed of comminuted meat, together with fillers, seasonings, spices etc., and is used to fill sausage casings. The sausage emulsion is introduced through a stuffing horn into a sausage casing. In the case of small sausages, the casing which is filled with sausage emulsion is twisted, tied or clipped and thus formed into suitable links at predetermined intervals and is subsequently processed. In the case of large sausages, such as bolognas, salamis, and the like, the sausage meat emulsion is introduced into a large, heavy-walled casing with the end closed, and is formed into a single large link or stick of sausage. The casing filled with the sausage meat may be subjected to cooking, smoking, etc., or in some cases may be supplied to the customer without additional processing. Small sausages, of the frankfurter and knockwurst or vienna type, are generally smoked and cooked and the casing removed prior to marketing.

In the preparation of various types of sausages a variety of casings are employed. Pork sausages and certain other small sausages are stuffed into natural gut casings or certain other types of synthetic edible casings. The small sausages, such as frankfurters, use small-diameter, thin-walled casings prepared from regenerated cellulose or other suitable materials. These casings are generally shirred and compressed from lengths in the range of 40 to 160 feet or more down to a shirred and compressed length of the order of 6 to 24 inches.

Natural casings and small, thin-walled cellulose casings were originally prepared in shirred form by hand shirring. At a later date, machines, such as that disclosed in Dietrich U.S. Pat. 2,010,626, were developed to shirr casings for delivery to the meat packer in shirred form. Later, automatic machinery was developed for shirring casing such as that disclosed in Korsgaard U.S. Pat. 2,583,654. Still later, improved apparatus, such as that shown in Blizzard et al. U.S. Pats. 2,722,714; 2,722,715; and 2,723,201, was developed for production of shirred casings that were more uniform in appearance and easier to handle. While various shirring apparatus and processes described in the aforementioned patents are primarily used in the shirring of thin-walled, small-diameter casings for small sausages, they are applicable to the shirring of large casings and in recent years there has been an increasing demand by the meat packers for large casings which are preshirred in preparation for application to the stuffing horn.

While small sausages, such as frankfurters, are usually prepared using thin-walled, small-diameter, shirred cellulose casings, larger sausages are prepared using larger-diameter, heavy-walled casings, referred to in the trade as "miscellaneous" casings. These casings are sometimes provided in shirred form to the meat packer and sometimes sold as flattened tubes of relatively short lengths which are handled by the meat packer without the necessity of preshirring. Still larger sausages of the bologna type, are generally prepared using fibrous paper reinforced casings, known in the trade as "fibrous." casings Fibrous casings are prepared by forming a high wet-strength hemp paper (or other suitable paper) into a tube of indefinite and continuous length and impregnating the tube with viscose and regenerating the cellulose therein. The fibrous and miscellaneous casings are normally cut into relatively short (e.g. 4–8 foot) lengths and are bunched or shirred by hand onto a stuffing horn by the stuffing machine operator. In some cases, miscellaneous and fibrous casings are preshirred and delivered to the packer as shirred strands for ease of application to the stuffing horn. Both miscellaneous and fibrous casings have been shirred using the process and apparatus of the Blizzard et al. patents and the shirred products have proved to be especially useful in the continuous preparation of large diameter sausages.

In the preparation of large diameter sausages, a fibrous or miscellaneous casing is placed on a stuffing horn and the end of the casing closed off in preparation for filling. The sausage emulsion is ejected through the horn which causes the casing to feed off and be filled. The stuffing apparatus is usually used in combination with a tying or clipping apparatus for forming the filled casing into links or sticks of pre-determined length. In stuffing casing to form large sausages, the stuffing machine operator usually holds the casing on the stuffing horn with one hand to restrict the flow off the horn while operating the sausage meat valve with his other hand. It is necessary to hold the casing on the horn both to restrict the flow of casing and to prevent meat from flowing backward around the horn and filling the casing at that point. This has presented some safety hazards and has been quite inefficient. There has been a considerable need in the sausage making industry for a suitable mechanism or process for controlling the flow of large diameter sausage casing off the stuffing horn while permitting the stuffing machine operator to use both hands and controlling other portions of the equipment.

In preparing large diameter sausages, another important consideration is the maintenance of accurate size control over the stuffed sausage being produced. It is very important that the diameter of large sausages be controlled very carefully so that the meat packer may slice the sausage into slices of predetermined thickness and diameter for prepackaging. The slices must be accurately sized so that a given number of slices weigh a precisely predetermined amount. When a meat packer is prepackaging sliced sausage meats he requires that a given number of slices weigh exactly one pound or some other pre-selected weight. In stuffing large diameter sausages, there is some tendency to obtain a variation in sausage diameter depending upon the stretch characteristics of the sausage casing and the pressure used in stuffing. There is less variation in diameter of stuffed sausages which use fibrous casing than those which use miscellaneous casing. However, accurate size control is required for both types of casing where the sausage is to be sliced and packaged prior to delivery to the retailer.

DESCRIPTION OF THE PRIOR ART

The prior art has given relatively slight consideration to the problem of controlling the flow of casing off a stuffing horn and in particular controlling the size of the stuffed sausage product. Hottmann U.S. Pat. 1,366,183 discloses a sausage stuffing and linking apparatus having spring loaded friction shoes that engage a sausage casing at the end of the stuffing horn and retard the flow of casing off the stuffing horn. Short U.S. Pat. 3,192,559 discloses a sausage casing apparatus which comprises a free-floating rubber ring which is positioned around a sausage casing and floats against the clipper or tyer in a stuffing machine assembly. The free-floating rubber ring engages the stuffed casing and frictionally retards its flow off of the stuffing horn. This construction prevents the flow of sausage emulsion back around the stuffing horn and insures that the sausage stick is fully stuffed. The Short apparatus, however, does not control the size of the stuffed sausage product accurately since it does not provide a variable control for the flow of sausage casing off the stuffing horn in response to variations in size of the stuffed sausage product. In the prior copending application of Harry G. Washburn Ser. No. 584,732 filed Oct. 6, 1966, now Pat. No. 3,454,980, issued July 15, 1969, there is disclosed an improved casing sizer for controlling the size of sausages. The Washburn apparatus includes a friction device engageable with the casing to press it against the end of the stuffing horn while the casing is being fed from the horn and stuffed. The friction device is movable to apply a variable friction force and is operated by a friction device against which the stuffed casing moves and is operable when the casing over-expands to move the first named friction device away from the stuffing horn to permit the casing to flow off the horn more freely. The variable movement of the friction device at the stuffing horn by the friction device against which the stuffed casing moves is operable to control the size of the stuffed casing within relatively small limits. This apparatus however does not control the size of the casing accurately enough to meet the requirements of certain meat packers and also does not have the versatility in handling a variety of different sizes of casings which some packers require.

STATEMENT OF OBJECTS AND FEATURES OF THE INVENTION

It is, therefore, one object of this invention to provide a new and improved process and apparatus for use in combination with a stuffing machine to control the flow of casing off the stuffing horn.

Another object of this invention is to provide a new and improved process and apparatus for use in combination with a stuffing machine to restrict the flow of sausage casing variably off a stuffing horn and thus control the size of stuffed sausages produced upon filling of the casing.

Still another object of this invention is the provision of an improved process and apparatus used in conjunction with a stuffing machine wherein the rate of flow of sausage casing off of the stuffing horn is varied in accordance with the diameter of a stuffed sausage product.

A feature of this invention is the provision of an improved process and apparatus wherein friction means is applied with variable force to sausage casing being fed off of a stuffing horn and the amount of frictional force is varied in accordance with the size of the sausage product produced.

Another feature of this invention is the provision of an improved process and apparatus which includes means responsive to the diameter of a stuffed sausage for applying a variable friction force to the sausage casing at the time of stuffing and thus producing a sausage of substantially constant predetermined diameter.

Other objects and features of this invention will become apparent from time to time throughout the specification and claims as hereinafter related.

SUMMARY OF THE INVENTION

This invention comprises a new and improved stuffing and sizing apparatus for the production of stuffed sausage products. The apparatus includes a stuffing horn on which a sausage casing is placed (preferably in a shirred condition) for filling with sausage emulsion. The apparatus includes a friction device engageable with the casing to press it against the stuffing horn while the casing is being fed from the stuffing horn and stuffed. The friction device is movable laterally along the axis of the stuffing horn to apply a variable friction force and is operated by means responsive to the diameter of the stuffed casing product. The responsive means is preferably an automatic sensing means responsive to expansion of the casing to a pre-determined size which automatically operates an air pressure motor controlling the application of force to said friction means. The responsive means is operable when the casing expands to a pre-determined size to permit said friction device to move away from the stuffing horn to permit the casing to flow off the horn more freely. This variable movement of the friction device at the stuffing horn by the air motor is operable to control the size of the stuffed casing accurately.

BRIEF DESCRIPTION OF THE DRAWINGS

In the accompanying drawings, to be taken as a part of this specification, there is clearly and fully illustrated a preferred embodiment of this invention, in which drawings, FIG. 1 is a view in side elevation of a combined sausage stuffing and linking device incorporating a preferred embodiment of this invention and illustrating a partially formed sausage therein, FIG. 4 is a detail view, taken in longitudinal section, of the end of the stuffing horn and the casing sizer, FIG. 5 is a detail view, in section, of the end of the casing sizer showing the clipper in operation, FIG. 6 is a detail sectional view taken on the lines 6—6 of FIG. 5 showing the casing clipper in operated position.

DESCRIPTION OF THE PREFERRED EMBODIMENT

Figure 3:
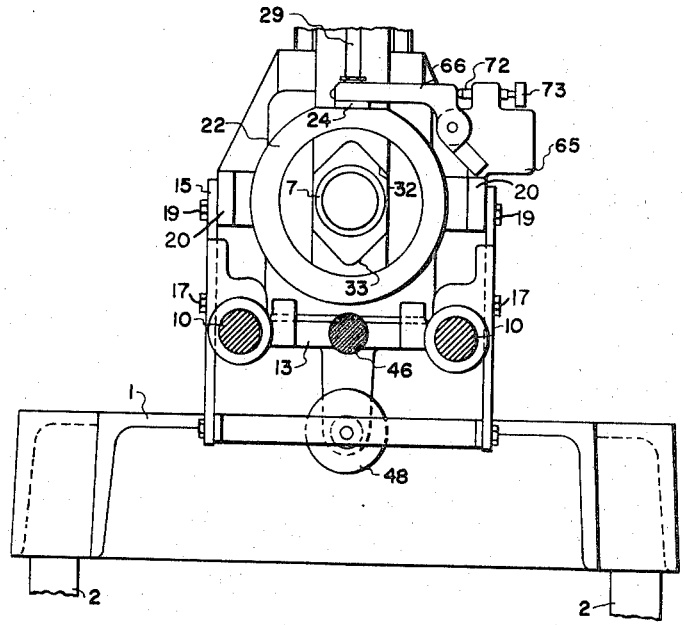
FIG. 3 is a sectional view taken on the line 3—3 of FIG. 1.
Figure 2:
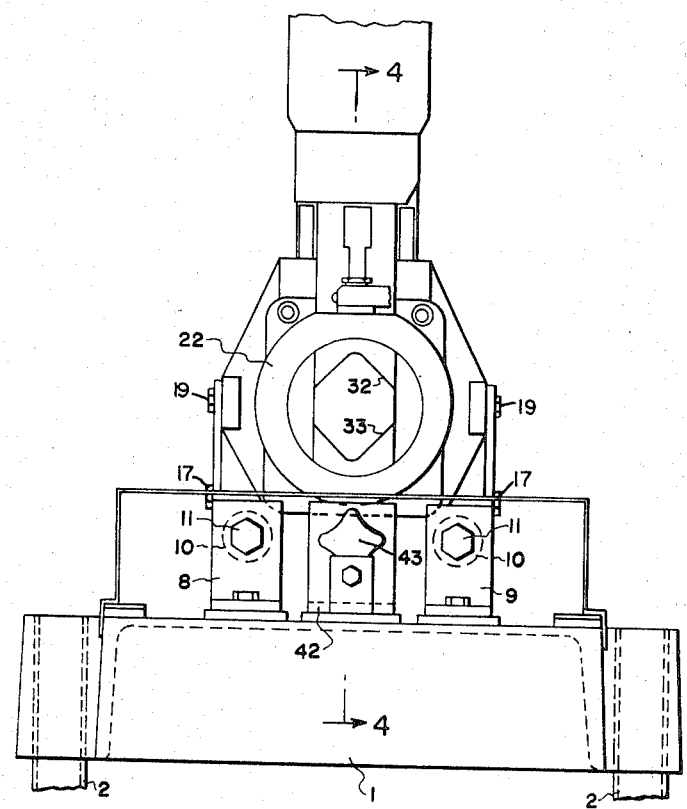
FIG. 2 is a view in right elevation of the apparatus shown in FIG. 1 with the stuffed sausage removed.

Referring to the drawings by numerals of reference, and more particularly to FIG. 1, there is shown a combined sausage stuffing horn and sizer apparatus for regulating the rate of feed of sausage casing and the size of stuffed sausage products. The apparatus comprises a table portion 1 having vertically extending tubular supporting legs 2. At the left end of table 1 there is secured a vertically extending plate 3 which supports a stuffing horn 4. Stuffing horn 4 has a flanged end 5 for connection to a source of sausage emulsion for preparation of sausages and has a slightly enlarged end portion 6 having a conical face 7.

At the right end of table 1 there are provided a pair of abutments 8 and 9 which support the ends of rods 10, the other ends of which are supported in vertically extending plate 3. Rods 10 are secured by nuts 11 in abutments 8 and 9 and by nuts 12 at supporting plate 3.

Supported on rods 10 is carriage 13 which is slidably movable along the rods. Carriage 13 provides a fixed support for supporting levers 14 and 15. Levers 14 and 15 are secured on carriage 13 by bolts 16 and 17 respectively and are secured at their upper ends by bolts 18 and 19 to supporting plate 20. Supporting plate 20 is in turn and secured on and supports casing sizer 21. Casing sizer 21 includes sleeve member 22 having a smooth bore 23 defining the maximum expansion of the sausage casing being stuffed in the apparatus. The sleeve member 22 has a movable sensing member 24 mounted thereon which is shown in more detail in FIG. 8 and is operatively connected in a pneumatic control circuit as illustrated schematically in FIG. 7. Sensing member 24, as will subsequently be described, senses the expansion of a stuffed casing to a pre-determined size and controls the amount of force applied urging sleeve member 22 into engagement with the end face 7 of stuffing horn 4.

Sleeve member 22 also supports a clipper device 25 which is a well known casing clipper made by Tipper Tie Division, Rheem Manufacturing Company. Sleeve member 22 also supports annular ring 26 which is of rubber or plastic or other elastomeric material and engages the conical face 7 of stuffing horn 4 to control the rate of feed of casing off of the stuffing horn. In this apparatus the casing is designated 27 and is shown in a shirred condition on stuffing horn 4. Casing 27 is tied or otherwise closed at the end of the stuffing horn as indicated at 28. As the sausage meat emulsion is ejected into the casing, the casing is expanded and completely filled with sausage. The expanded casing is limited in size by the internal diameter of sleeve member 22 and by the proximity of the casing to sensing member 24. The rate of flow of casing off of stuffing horn 4 is controlled by the amount of friction introduced by annular ring 26 against conical face 7 of stuffing horn 4.

The casing clipper 25 is a commercially available clipper which is secured in the apparatus as shown in the drawings. Clipper 25 includes an arm or hopper 29 for storage and supply of U shaped clips which are used for securing the end of the stuffed sausage. Clipper 25 is provided with upper air cylinder 30 and lower air cylinder 31 which are operated by a source of compressed air (not shown). Air cylinder 30 operates upper and lower clamping members provided with V-shaped notches 32 and 33 respectively. A second set of clamping members 32 and 33 are provided in the clipper and operated by cylinder 31. When the clamping members are brought together by air cylinder 31 the casing end is closed by engagement of the V-shaped notches as indicated in FIGS. 5 and 6. Members 32 and 33 clamp the casing to hold it tightly closed while the clip is applied. A casing clip 34 is applied around the clamped casing as shown in FIG. 5. Next, air cylinder 30 operates compression members 35 and 36 which move reciprocally between the clamping members 32 and 33. Compression members 35 and 36 engage clip 34 as shown in FIG. 5 and 6 and compress the clip to cause it to secure the end of the casing tightly against leakage of sausage meat from the filling stuffed sausage.

The casing sizer 21 is constructed for maintaining accurate control of the size of the stuffed sausage product. Lever 15 which supports the sizer 21 has a lower extension 37 on which there is mounted an air motor 48 which is arranged to apply pressure against lever extension 37 and thus, through the pivotal movement of levers 14 and 15 about bolts 16 and 17, force casing sizer 21 laterally against conical face 7 of stuffing horn 4. Air motor 48 and its relationship to casing sizer 21 are shown in more detail in FIGS. 7, 8 and 9.

Air motor 48 comprises housing portions 49 and 50 with diaphragm 51 secured therebetween and defining pressure chambers 53 and 52 respectively. Rod 54 is slidably guided in aperture 55 in housing member 49 and is sealed against air leakage by O-ring 56. Rod 54 is sealed in diaphragm 51 as indicated at 57. The opposite end of rod 54 comprises a small rod portion guided in passageway 59 and having relief passage 59a equalizing air pressure with chamber 52 as the rod is moved. Air motor housing 50 ls provided with inlet passageway 60 opening into air chamber 52. Likewise, air motor housing 49 is provided with inlet passageway 61 opening into air chamber 53. The air motor 48 is supported with projecting portion 62 positioned in a recess in support member 63 which is fixedly supported on carriage 13. Rod 54 is positioned to engage and operate yoke 64 which is secured to and operates lever extension 37. On application of a suitable air pressure differential across diaphragm 51, rod 54 is moved to apply pressure through yoke 64 and lever extension 37 to press annular ring 26 laterally against the conical face 7 of stuffing horn 4.

Figure 7:
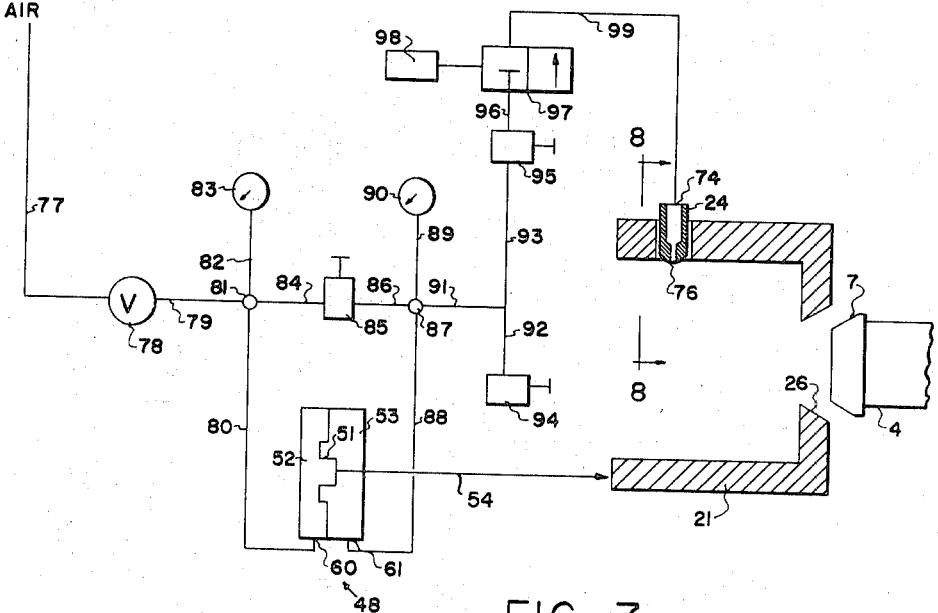
FIG. 7 is a schematic view showing the air motor and size sensing devices controlling the operation of the casing sizer.
Figure 8:
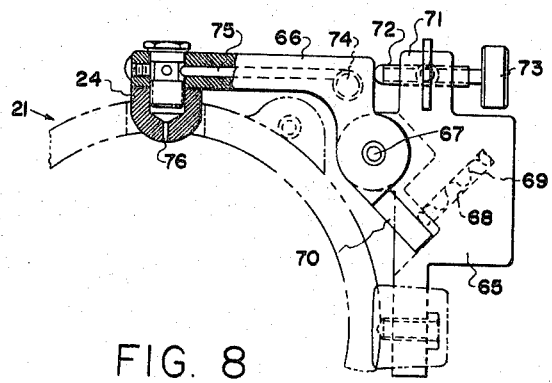
FIG. 8 is a detail view of the adjustable size sensing member of the casing sizer.
Figure 9:
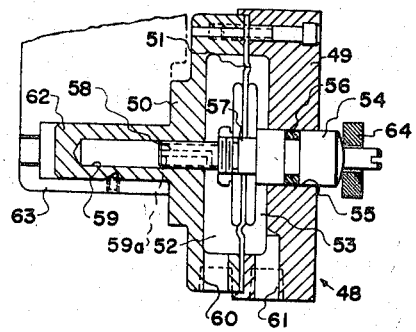
FIG. 9 is a sectional view of the air motor controlling operation of the casing sizer.

Casing sizer 21 is provided with size sensing member 24 which is shown generally in FIGS. 1, 4 and 7 and shown in detail in FIG. 8. Bracket member 65 is supported on casing sizer 21 and has movable member 66 pivotally supported thereon as indicated at 67. Bracket member 65 includes recess 68 in which there is positioned spring 69 abutting the end portion 70 of movable member 66 to urge the same in a clock-wise rotation as viewed in FIG. 8. Bracket member 65 includes projecting portion 71 in which there is threadedly supported screw member 72 having operating handle 73. Movement of screw member 72 by rotation of handle 73 causes member 66 to be moved in either direction depending upon the direction of rotation of handle 73. Member 66 is provided with an inlet opening 74 arranged for connection in a pneumatic motor circuit, as shown in FIG. 7. Inlet opening 74 connects with passage 75 which opens into sensing member 24 having an air outlet orifice 76. Adjustment of member 24 and orifice 76 by rotation of handle 73 is effective to bring orifice 76 closer or farther away from contact with casing being stuffed and passing through sizer 21. This variation in position of member 24 and orifice 76 is operable to effect a variation in size control of the casing being stuffed within the limits of movement of member 24.

In FIG. 7, there is shown a schematic connection for air motor 48 and movable sensing member 24 in a pneumatic control circuit and there is illustrated the variable application of pneumatic force against casing sizer 21 to control the stuffing of casing. Compressed air is supplied through conduit 77 to inlet control valve 78 which is in turn connected by conduits 79 and 80 to inlet passage 60 in air motor 48. At connection point 81 conduit 82 is connected to pressure gauge 83 which registers the pressure applied to air motor 48. From connection point 81 conduit 84 is connectced to a manually operated needle valve 85 which is in turned connected by conduit 86 to connection point 87. From connection point 87 conduit 88 is connected to opening 61 in air motor 48. Connection point 87 is also connected by conduit 89 to pressure gauge 90.

Connection point 87 is further connected by conduit 91 and conduits 92 anrd 93 to manually operated needle valves or bleed valves 94 and 95 respectively. From valve 95, conduit 96 connects to one side of control valve 97 having control member 98 arranged to shut off the valve when there is no casing on the stuffing horn. The outlet side of valve 97 connected by conduit 99 to inlet opening 74 on movable sensing member 24.

In this schematic diagram, rod 54 is shown by a single line and is indicated as bearing directly on casing sizer 21. This, of course, illustrates schematically the mechinical linkage comprising yoke 64, lever extension 37 and lever 15 which transmits force from rod 54 to the casing sizer 21.

In the pneumatic control circuit described above, compressed air is applied to chamber 52 on the left side of diaphragm 51 as viewed in FIG. 7. Compressed air pressure is also applied through the bleed valve 85 and conduits 86 and 88 to chamber 53 on the right side of diaphragm 51. Valve 85 is maintained at a setting which permits a substantial static pressure to be equalized on opposite sides of the valve but which provides enough of a flow restriction to create a substantial pressure drop in the event of air flow through the valve. The connection from point 87 through coduits 91, 93, 96 and 99 to movable sensing member 24 provides on open passage through which air may flow. Whenever the open end of orifice 76 in movable member 24 is free of obstruction there is an air flow through the conduits just mentioned which results in a substantial drop in air pressure to the right side of bleed valve 85. When orifice 76 is free of obstruction the air pressure on the right side of diaphragm 51 is substantially less than the air pressure in chamber 52 to the left side of diaphragm 51 and the differential in pressure is applied through rod 54 to casing sizer 21 to cause sizer 21 to move laterally along the axis of stuffing horn 4 and thus to press the same against the conical end 7 of stuffing horn 4. Whenever the orifice 76 in movable member 24 is restricted or closed the flow of air through conduits 86, 91, 93, 96 and 99 is reduced or even completely cut off and the pressure in chamber 53 rises and approaches that in chamber 52 which thus equalizes the pressure across diaphragm 51 and reduces or eliminates the pressure applied to casing sizer 21.

The entire sizer apparatus 21 is mounted on rods 10 by means of carriage 13 as previously described. Carriage 13 is arranged for longitudinal movement along rods 10. Supporting table 1 is provided with a bracket which supports an adjustment knob 43 for cylinder 44. Cylinder 44 cooperates with piston 45 having connecting rods 46 secured to carriage 13. Adjustment of knob 43 adjusts the position of piston 45 and thus moves carriage 13 and sizer device 21 into a pre-determined position relative to stuffing horn 4. When the sizer device 21 is positioned adjacent to and engaging the conical face 7 on stuffing horn 4, the pneumatic circuit shown in FIG. 7 and described above controls the amount of force applied against ring 26 to compress the casing against conical face 7 on stuffing horn 4.

OPERATION

In operation, this apparatus is used for stuffing and sizing large-diameter sausage casings, usually fibrous casings. A large-diameter sausage casing is placed on stuffing horn 4 as indicated in FIG. 1. The casing may be pre-shirred and positioned on the stuffing horn in a shirred condition. Alternatively, the casing may in some instances be used without shirring or may be hand shirred onto the stuffing hirn, depending upon the length of casing to be stuffed. The end portion of the casing is closed, as by tying or clipping, or a casing may be used which is preclosed and provided with a hanging strap 28 as shown in FIG. 1. The adjustment knob 43 is moved to cause the clipper and sizer to be moved into position for engaging the end of the casing. In this position annular ring 26 engages the casing against conical face 7 as shown in FIGS. 1 and 4 of the drawing. Valve 78 is adjusted to apply compressed air to air motor 48 as previously described. Bleed valves 85 and 95 are adjusted to permit air flow to size sensing member 24. Bleed valve 94 is completely closed. In this position, a pressure differential is maintained across diaphragm 51 whenever the orifice 76 in sensor member 24 is unobstructed. The pressure differential across diaphragm 51 is operable to urge ring 26 against conical face 7 of stuffing horn 4 and retard the flow of casing off of the stuffing horn and thus insure that the sausage is stuffed to the desired size.

The sausage meat is then pumped under pressure from a sausage batter tank (not shown) through stuffing horn 4 to fill the casing 27 as shown in FIGS. 1, 4 and 5. The sausage batter or emulsion fills the casing 27 to a size limited by the internal diameter of sizing sleeve 22. The rate of flow of casing off of stuffing horn 4 is determined by the friction maintained between annular ring 26 and the conical face 7 of stuffing horn 4. When the flow of casings is retarded the sausage emulsion, which is supplied at a substantially constant flow rate, causes the casing to fill more firmly. If the casing tends to overstuff, it approaches the open end of orifice 76 in sensing member 24. As the casing approaches orifice 76 it reduces the air flow through that orifice and if it overstuffs to the point where it touches member 24 it may completely shut off air flow through orifice 76. As orifice 76 is gradually closed the air flow therethrough is substantially reduced and pressure in chamber 53 of air motor 48 increases to approach the air pressure in chamber 52. This increase in pressure in chamber 53 tends to equalize the pressure across diaphragm 51 and reduces the force applied through rod 54 against annular ring 26. The reduction in force applied against annular ring 26 reduces the frictional force applied by ring 26 against conical face 7 and permits the casing to flow more freely off of the stuffing horn. This allows more casing to flow in relation to the amount of sausage batter or emulsion pumped into it and the sausage therefore reduces slightly in diameter.

As the sausage is no longer so tightly filled, the obstruction or orifice 76 in movable sensing member 24 is reduced. This permits air to bleed from chamber 53 through conduits 88, 91, 93, 96 and 99 which results in a pressure differential being created across diaphragm 51. This pressure differential is applied through piston 54 against annular ring 26 which thus presses the casing tightly against the conical end face 7 of stuffing horn 4. The casing is then retarded in flow off the stuffing horn which results in it being stuffed more fully which then obstructs orifice 76 and equalizes the pressure across diaphragm 51.

Valve 94 is adjustable to determine the pressure drop across diaphragm 51 and thus determines the constant pressure applied by annular ring 26 against the conical end 7 of stuffing horn 4. Valve 97 functions during start-up of the apparatus to open line 99 a pre-determined time (e.g. 0.2 sec.) after the emulsion flow is started. This allows the casing to begin flowing off the stuffing horn without damage by excessive force between annular ring 26 and conical face 7.

This apparatus is therefore operable to perform the dual function of preventing sausage emulsion from flowing back around the stuffing horn and maintains accurate size control over the sausage being produced. The accuracy of control with this arrangement is greater than that obtained by the Washburn casing sizer from which this apparatus was developed. The size of the sausage i.e. the diameter of the sausage being produced, is accurately controlled by the positioning of the sizing apparatus in relation to the end of the stuffing horn and the positioning of sensing member 24. The sensing member 24 may be adjusted within a limited range of movement by adjusting screw 73 to determine the amount of expansion of casing required before orifice 76 is closed sufficiently to equalize the pressure in air motor 48 and allow annular ring 26 to move laterally away from the end of stuffing horn 4 and permit the casing to flow more freely off of the stuffing horn 4. The size of the stuffed sausage is entirely dependent upon the positioning of sensing member 24. The amount of compressed air applied in the pneumatic circuit and the relative setting of the various belled valves largely determines the sensitivity of control of the apparatus.

What is claimed is:

1. The combination with the sausage stuffing horn through which sausage meat is ejected and on which a casing is positioned for filling, of a sizer for controlling the diameter of sausages produced thereby, said sizer comprising fluid pressure operated control means controlling the rate of flow of casing off of the stuffing horn, and sensing means responsive to variations in diameter of the sausage product and operatively connected to pneumatically communicate with said fluid pressure operated control means to thereby cause said control means to permit a faster rate of casing flow whenever the sausage product exceeds a pre-determined diameter.

2. A casing sizer combination as defined in claim 1 in which said sizer includes means positioned in frictional engageable relation with the end of the stuffing horn and adapted for lateral movement along the axis of said stuffing horn to apply a variable endwise force to the casing flowing off of the horn, and wherein said fluid pressure operated control means urges said movable means into engagement with said stuffing horn and said sensing means is operatively connected to said fluid pressure operated control means to cause the said control means to reduce the amount of force applied to said movable means to reduce the amount of friction applied to the casing in response to enlargement of the stuffed sausage beyond a pre-determined diameter.

3. A casing sizer combination as defined in claim 1 in which said sizer includes means to close the end of a fully stuffed sausage.

4. A casing sizer combination as defined in claim 2 in which said movable means comprises an annular elastic resilient ring member engageable with the end of the stuffing horn, and said responsive sensing means comprises a sleeve through which the stuffed sausage moves and in which is positioned for contact with the stuffed casing a sensing member having an air bleed orifice, said fluid pressure operated control means comprising an air motor having a diaphragm operatively connected to said sleeve member for laterally moving said sleeve member to press said annular elastic resilient ring member against the end of the stuffing horn, said air motor including pneumatic connections for connecting one side of the diaphragm to a compressed air source and for connecting the other side of the diaphragm to the orifice in said sleeve member, whereby the closing of said orifice equalizes pressure across said diaphragm and reduces the force applied to move said ring member against the end of the stuffing horn and opening of said orifice establishes a pressure differential across said diaphragm to increase the force applied to press said ring member against the end of said stuffing horn.

5. A casing sizer combination as defined in claim 4 in which said stuffing horn has a conical end surface and said ring member is movable into and out of operative engagement therewith.

6. A casing sizer combination as defined in claim 4 in which a movable support is provided for said sleeve and ring members and is movable toward and away from said stuffing horn.

7. A casing sizer combination as defined in claim 4 in which a casing clipping device is secured in said sizer between said sleeve and ring members and is movable therewith.

8. A casing sizer combination as defined in claim 1 in which said sizer comprises
   (a) a support in fixed position relative to said stuffing horn,
   (b) a carriage movable along said support,
   (c) means for adjusting the postion of said carriage on said support,
   (d) a sleeve member having an aperture in the wall thereof, a sensing member mounted on said sleeve member and movable into and out of said aperture and having an air bleed orifice,
   (e) a plurality of supporting levers connected to said sleeve member and carriage to support said sleeve member for movement thereon,
   (f) an air motor comprising a housing having a force transmitting diaphragm defining two air chambers therin, one of said chambers being adapted to be connected to a source of compressed air, and the other of said chambers being connected in pneumatic circuit with the orifice in said sensing member, said diaphragm being operatively connected to said sleeve member to move the same toward engagement with said stuffing horn,
   (g) a casing clipper device secured on said sleeve member,
   (h) an annular ring member of resilient elastic material supported on said sleeve member adjacent to said clipper device and positioned to engage the end of said stuffing horn,
   (i) said stuffing horn having a conical end face engageable by said ring member with a force determined by the pneumatic pressure applied to the diaphragm in said air motor,
   and the sausage being stuffed being operable upon overstuffing to obstruct the orifice in said sensing member, thereby causing the pressure across said diaphragm to equalize to allow said ring member to move away from the stuffing horn to permit flow of casing off the stuffing horn at a faster rate.

References Cited
UNITED STATES PATENTS

| | | | |
|---|---|---|---|
| 2,929,100 | 3/1960 | Demarest et al. | 17—35 |
| 2,999,270 | 9/1961 | Knapp | 17—35 |
| 3,148,408 | 9/1964 | Good | 17—35 |
| 3,192,559 | 7/1965 | Short | 17—35 |
| 3,396,426 | 8/1968 | Ziolko | 17—35 |

LUCIE H. LAUDENSLAGER, Primary Examiner

U.S. Cl. X.R.

17—33